United States Patent [19]
Gruettner et al.

[11] Patent Number: 5,303,818
[45] Date of Patent: Apr. 19, 1994

[54] MODULAR CONVEYOR BELT

[75] Inventors: David R. Gruettner, Mequon; Robert J. Gladczak, Milwaukee, both of Wis.

[73] Assignee: UCC Corporation, New Berlin, Wis.

[21] Appl. No.: 817,943

[22] Filed: Jan. 3, 1992

Related U.S. Application Data

[63] Continuation of Ser. No. 526,170, May 21, 1990, abandoned.

[51] Int. Cl.$^5$ ............................................. B65G 17/06
[52] U.S. Cl. .................................... 198/850; 198/853
[58] Field of Search ................ 198/850, 851, 852, 853

[56] References Cited

U.S. PATENT DOCUMENTS

| | | |
|---|---|---|
| D. 270,201 | 8/1983 | Hodlewsky et al. . |
| D. 270,202 | 8/1983 | Hodlewsky et al. . |
| D. 288,408 | 2/1987 | Bode et al. . |
| D. 291,777 | 9/1987 | Lapeyre et al. . |
| D. 299,424 | 1/1989 | Schroeder et al. . |
| D. 299,425 | 1/1989 | Schroeder et al. . |
| 2,000,499 | 5/1935 | Roland . |
| 2,911,091 | 4/1955 | Imse . |
| 3,036,695 | 5/1969 | Thuerman . |
| 3,641,831 | 2/1972 | Palmaer . |
| 3,669,247 | 6/1972 | Pulver . |
| 3,785,476 | 1/1974 | Poerink . |
| 3,804,232 | 4/1974 | Freiwald et al. ................ 198/853 |
| 3,870,141 | 3/1975 | Lapeyre et al. . |
| 3,939,964 | 2/1976 | Poerink . |
| 4,051,949 | 10/1977 | Lapeyre . |
| 4,080,842 | 3/1978 | Lapeyre et al. ............ 198/853 X |
| 4,084,687 | 4/1978 | Lapeyre . |
| 4,096,943 | 6/1978 | Gentsch . |
| 4,114,467 | 9/1978 | Petershack . |
| 4,159,763 | 7/1979 | Kewley et al. . |
| 4,195,887 | 4/1980 | Ruddell . |
| 4,276,040 | 6/1981 | Petershack . |
| 4,353,459 | 10/1982 | Petershack . |
| 4,355,502 | 10/1982 | Sheldon . |
| 4,436,200 | 3/1984 | Hodleysky et al. . |
| 4,438,838 | 3/1984 | Hodlewsky et al. . |
| 4,538,510 | 9/1985 | Latimer et al. . |
| 4,556,142 | 12/1985 | Lapeyre . |
| 4,576,277 | 3/1986 | Park et al. . |
| 4,611,710 | 9/1986 | Mitsufuji ..................... 198/853 X |
| 4,618,056 | 10/1986 | Cutshall . |
| 4,640,410 | 2/1987 | Palmaer et al. . |
| 4,682,687 | 7/1987 | Leege et al. . |
| 4,688,670 | 8/1987 | Lapeyre . |
| 4,709,807 | 12/1987 | Poerink ............................ 198/853 |
| 4,729,469 | 3/1988 | Lapeyre et al. . |
| 4,742,907 | 5/1988 | Palmaer . |

(List continued on next page.)

FOREIGN PATENT DOCUMENTS

| | | |
|---|---|---|
| 948961 | 8/1956 | Fed. Rep. of Germany . |
| 2144290 | 9/1971 | Fed. Rep. of Germany . |
| 2237600 | 2/1974 | Fed. Rep. of Germany ...... 198/853 |
| 7613685 | 2/1978 | Netherlands .................... 198/853 |

OTHER PUBLICATIONS

"Cambridge Conveyor Belts for the Processing," The Cambridge Wire Cloth Co., 1961(?).

*Primary Examiner*—Joseph E. Valenza
*Assistant Examiner*—Tuan N. Nguyen
*Attorney, Agent, or Firm*—Reinhart, Boerner, Van Deuren, Norris & Rieselbach

[57] ABSTRACT

A modular conveyor belt having a plurality of substantially identical thermoplastic modules in end-to-end arrangement. The forward and rearward ends of the modules are provided with interlocking hinge barrels. A plurality of pivot pins extend through the hinge barrels and are retained by means of inserts received in sockets formed at each side of the modules. The upper surface of each module is flat and the corners formed at the forward and rearward ends are rounded to form a smooth transition between modules. The lower surface of each module is flattened somewhat to avoid increased apparent wear, and the side of the modules are rounded slightly to avoid height disparities between adjacent belts as the modules wear.

14 Claims, 3 Drawing Sheets

U.S. PATENT DOCUMENTS

| | | | |
|---|---|---|---|
| 4,765,454 | 8/1988 | Hodlewsky et al. | |
| 4,776,454 | 10/1988 | Momose | |
| 4,821,872 | 4/1989 | Lapeyre | |
| 4,832,187 | 5/1989 | Lapeyre | 198/853 X |
| 4,858,753 | 8/1989 | Hodlewsky | 198/853 |
| 4,865,183 | 9/1989 | Hodlewsky et al. | |
| 4,882,901 | 11/1989 | Lapeyre | |
| 4,886,158 | 12/1989 | Lapeyre | |
| 4,893,710 | 10/1990 | Bailey | |
| 4,901,844 | 2/1990 | Palmaer et al. | |
| 4,903,824 | 2/1990 | Takahashi | |
| 4,909,380 | 3/1990 | Hodlewsky | |
| 4,953,693 | 9/1990 | Draebel | 198/853 |
| 4,972,942 | 11/1990 | Faulkner | 198/853 |
| 5,020,659 | 6/1991 | Hodlewsky | 198/853 |

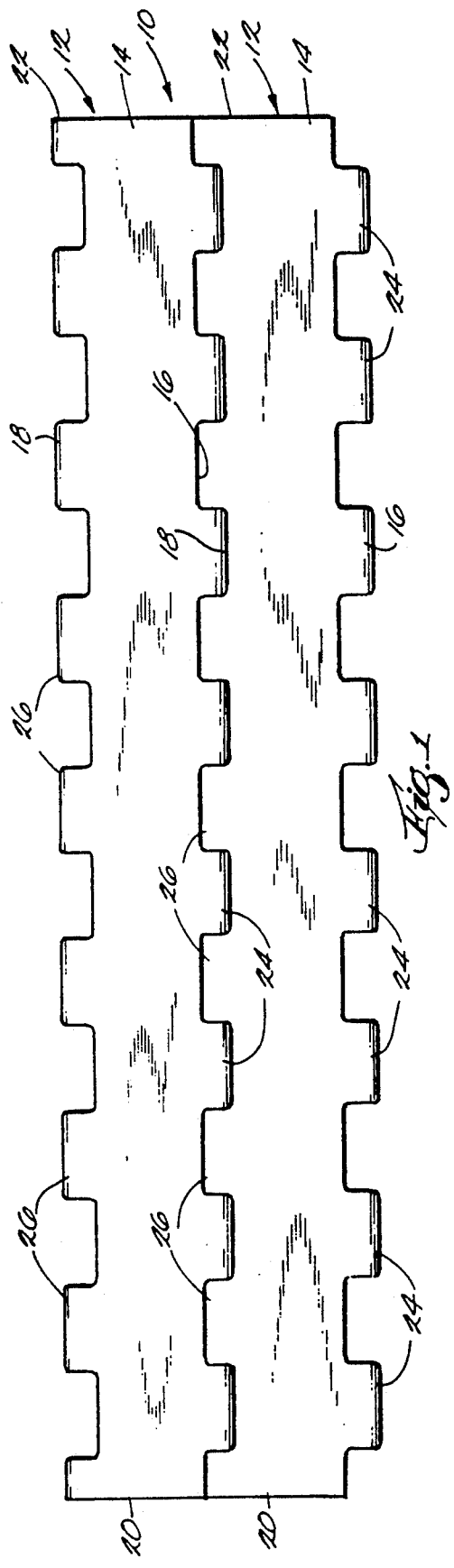
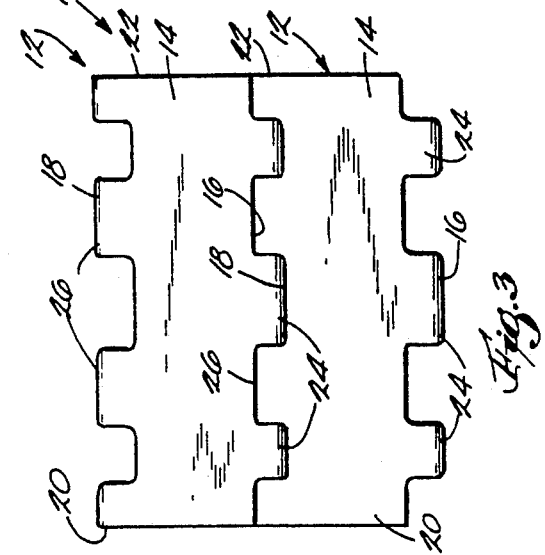
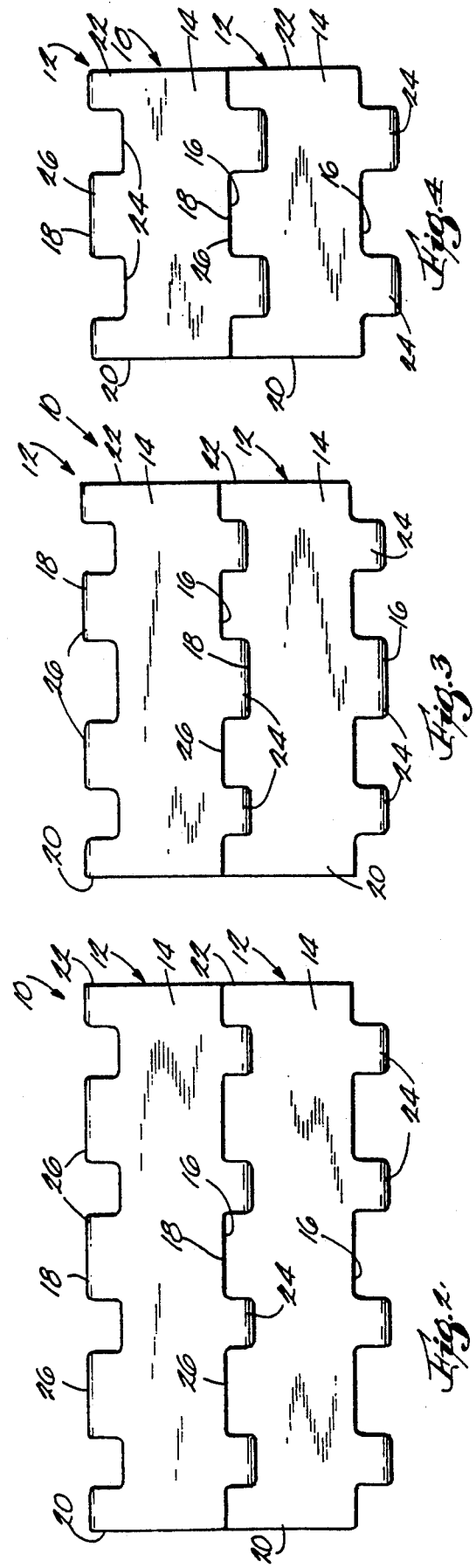

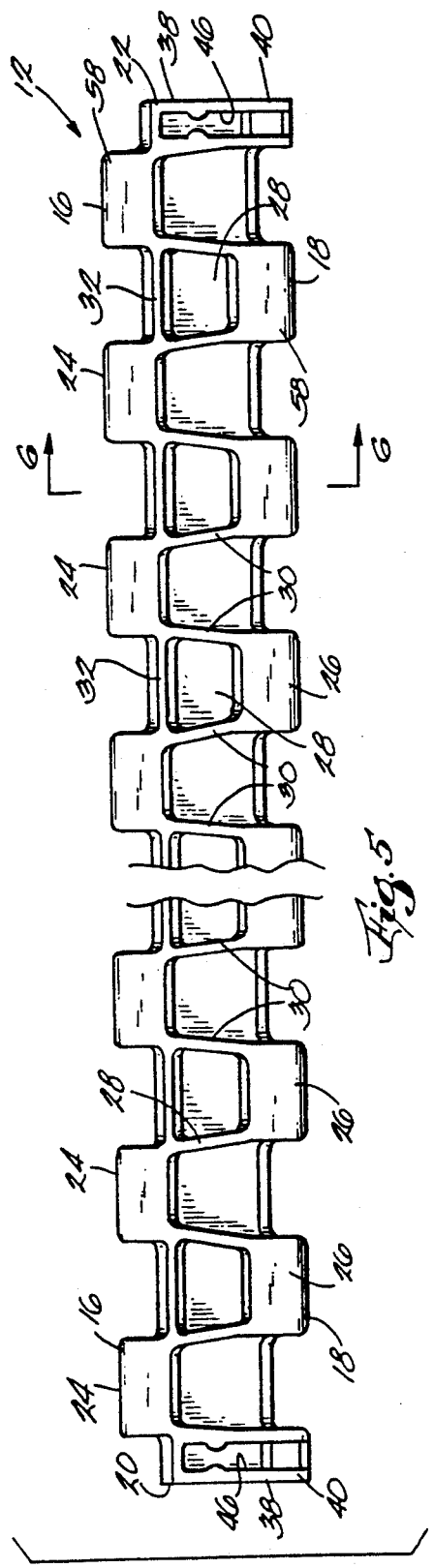
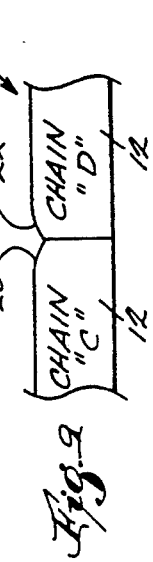
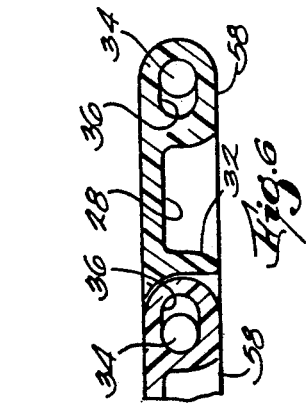
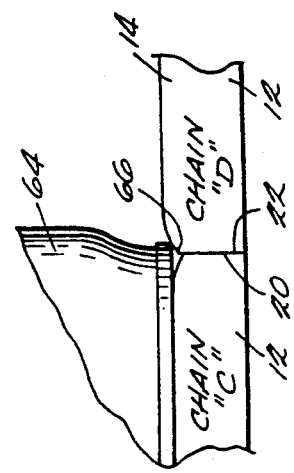
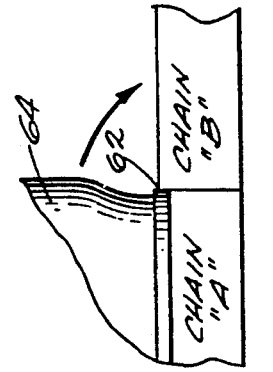

MODULAR CONVEYOR BELT

This is a continuation of copending application Ser. No. 07/526,170 filed on May 21, 1990, now abandoned.

BACKGROUND OF THE INVENTION

This invention relates generally to conveyor belts and, more particularly, to modular conveyor belt providing a flat, substantially continuous conveying surface.

The trend in many industries, particularly the beverage industry, is toward the use of modular conveyor belts. Such belts are formed of a plurality of linked, repeating modules and provide a substantially flat upper surface that is well suited for conveying cans and other containers. The modules are economically molded of thermoplastic materials and are pivotally linked to one another by any one of a variety of means.

Despite the many advantages of molded plastic modular belting, numerous problems remain to be solved. During use, the modular belting is typically advanced by means of a powered sprocket engaging the undersurface of the belt. The belt, in turn, slides along wear strips in the conveyor structure. Typically, the undersurface of the belt includes a plurality of cylindrical barrels, crossribs and conveyor belt edges that develop flat spots as the belt is used. Such wear reduces the apparent thickness of the modules and can create height differences or steps between adjacent belts. These discontinuities, in turn, can upset the cans as they are transferred between parallel belts. This is particularly troublesome when new conveyor belts are used in conjunction with older, worn belts.

Another problem with existing modular conveyor belts is that the various arrangements for linking the modules can be complex, difficult to use and prone to failure. Some methods require the user to melt and deform the ends of the pivot pins which is a difficult, time consuming task. Frequently, this step of linking the module is improperly done or is neglected altogether, and, in turn, the conveyor can jam during operation.

Still another difficulty with existing modular conveyor belts is that some applications, particularly those found in the food and beverage industries, require compliance with strict sanitary standards. These standards can be difficult to meet with existing modules which include numerous sharp corners and crevices which can trap foreign matter.

Finally, since each complete conveyor belt is typically made up of hundreds or thousands of individual modules, modules which have a structure that is easy and economical to manufacture and assemble are preferred.

In view of the foregoing, it is a general object of the present invention to provide an improved modular conveyor belt providing a flat, substantially continuous conveying surface.

It is a further object of the present invention to provide an improved modular conveyor belt which avoids the difficulties associated with uneven wear of the individual conveyor belt modules.

It is a further object of the present invention to provide an improved modular conveyor belt which includes linking means that are effective and easy to use.

It is a still further object of the present invention to provide a new and improved modular conveyor belt which can be kept clean and sanitary with minimal difficulty.

It is a still further object of the present invention to provide a new and improved modular conveyor belt which can be manufactured easily and economically.

SUMMARY OF THE INVENTION

The invention provides a modular conveyor belt comprising a plurality of modules in end-to-end relationship. Each of the modules includes a substantially planar upper surface and a forward end having a plurality of regularly spaced, forwardly projecting, substantially identical hinge barrels. Each of the hinge barrels has a length substantially equal to the space between adjacent ones of the hinge barrels. Each of the modules further includes a rearward edge having a plurality of regularly spaced, rearwardly projecting, substantially identical hinge barrels. Each of the hinge barrels on the rearward edge is substantially identical to the hinge barrels of the forward edge. Each of these hinge barrels has a length substantially equal to the length of the space between adjacent ones of the hinge barrels on the rearward edge. The hinge barrels of the rearward edge are located substantially opposite the spaces between the hinge barrels on the forward edge such that the hinge barrels on the leading edge of a trailing module are matingly received within the spaces formed between the hinge barrels on the rearward edge of the next adjacent leading module. Each of the modules includes an undersurface having formed therein a plurality of drive pockets and an insert socket at each side of the module. The modular conveyor belt further includes a plurality of pivot rods inserted through the aligned hinge barrels of adjacent modules and a retaining insert within each of the insert sockets for retaining the pivot rod within the aligned hinge barrels of adjacent modules.

In one embodiment of the invention, the upper container carrying surface of each module is rounded to form a taper or runout radius at the perimeter of the conveyor belt in order to avoid the creation of abrupt steps, causing container tipping, at the transitions between one conveyor belt and another. Such a feature also diminishes preferential wear of the conveyor belt perimeter arising from sharp steps of the conveying surfaces between conveyor belts.

In another embodiment, the hinge barrels are elongated, and the under surface of each hinge barrel is flattened in order to provide an enlarged wear surface for distributing functional wear of the modular conveyor belt.

In another form of the invention the modular belt drive pockets are formed by peripheral walls including a transverse cross strut or web providing enhanced belt rigidity and reduced mechanical backlash while the conveyor belt is driven. At least one of the longitudinal peripheral walls of the recesses is also rounded in order to provide engagement of the sprocket teeth over a range of rounded surface to spread wear evenly over the engaged peripheral recess walls.

In still another embodiment of the invention, each module is fabricated with a slightly bowed or convex profile convex relative to the conveying surface. Such a preferential convex shape insures a substantially flat conveying surface when the conveyor is fully loaded during conveying operations.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, wherein like reference numerals identify like elements, and wherein:

FIGS. 1-4 are top plan views of modular conveyor belts of various widths formed in accordance with the various aspects of the invention.

FIG. 5 is a bottom plan view of the undersurface of one module showing the configuration thereof.

FIG. 6 is a cross-sectional view of the module shown in FIG. 5 taken along line 6—6 thereof.

FIG. 7 is a diagramatic view of the juncture between adjacent modules in a prior art modular belt wherein the modules are equally worn.

FIG. 8 is a diagramatic view, similar to FIG. 6, of the juncture between adjacent modules in a prior art modular belt wherein the adjacent belt modules are unequally worn.

FIG. 9 is a diagramatic view of the juncture between adjacent belt modules in the modular belt of the present invention wherein the belt modules are equally worn.

FIG. 10 is a diagramatic view, similar to FIG. 9, of the juncture between adjacent belt modules in a modular belt of the present invention wherein the belt modules are unequally worn.

DESCRIPTION OF THE PREFERRED EMBODIMENT

Figure 11:
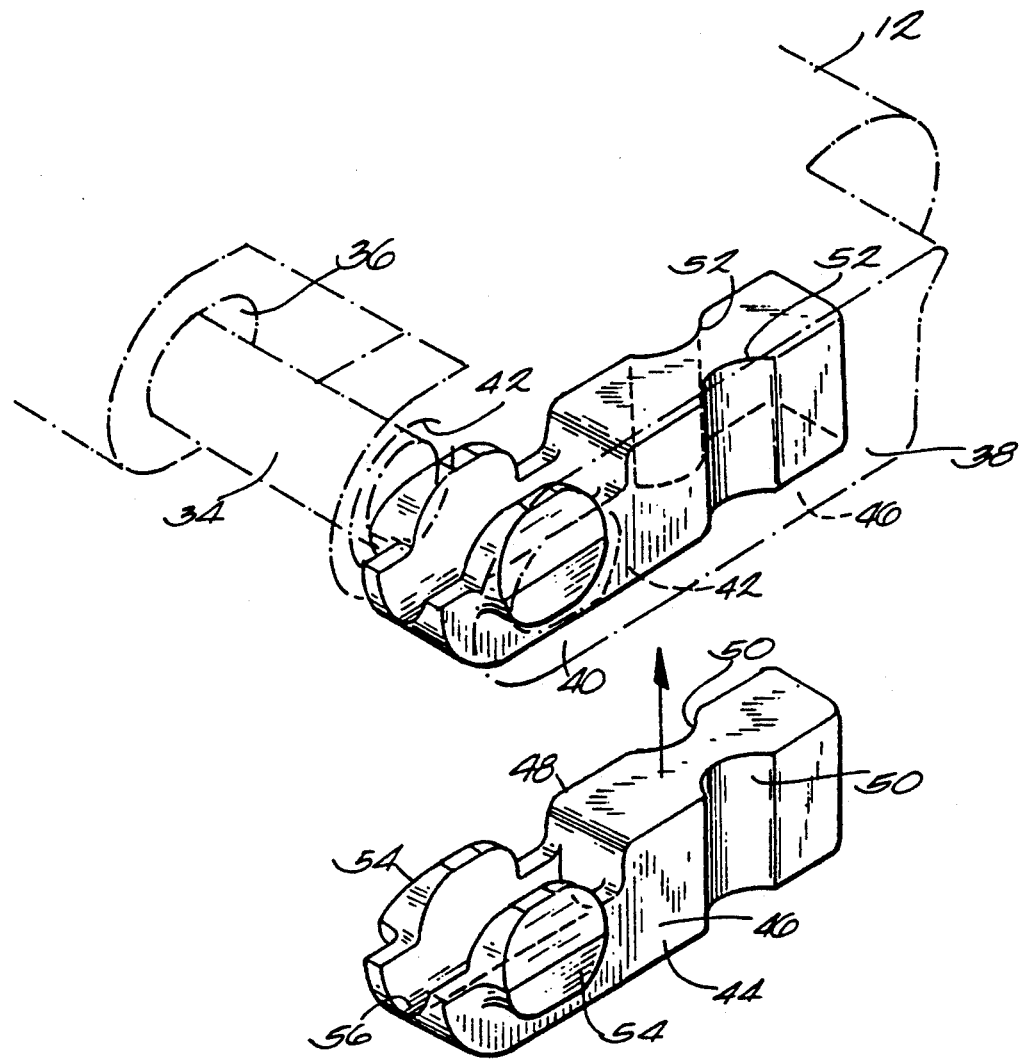
FIG. 11 is an exploded perspective view of one side of a belt module constructed in accordance with various aspects of the invention showing a retainer insert for retaining the ends of a pivot rod.

Referring to the drawings and in particular, to FIGS. 1 through 4, a modular conveyor belt 10 embodying various features of the invention is shown. As illustrated, the modular nature of the belt 10 allows the widths of the modular conveyor belt 10 to vary from relatively wide (FIG. 1), to relatively narrow (FIG. 4). Each of the modular conveyor belts 10 comprises a plurality of individual or unit modules 12 connected in end-to-end relationship. Each of the modules 12 is preferably formed of a molded thermoplastic material although other materials can be used.

Referring to FIGS. 1 through 6, each of the modules 12 includes a substantially flat upper conveying surface 14, a rearward end 16, a forward end 18 and a pair of sides 20, 22. In accordance with one aspect of the invention, the forward end 18 of each of the modules 12 includes a plurality of forwardly extending hinge barrels 26. The hinge barrels 26 are substantially identical to each other and are regularly spaced along the forward end 18. Each hinge barrel 26 has an axial length substantially equal to the width of the spaces between adjacent barrels 26. In practice, the spaces are slightly (e.g. 0.010 inches) longer than the length of the barrels. Preferably, each of the modules is molded with a slight upward crown so that the resulting belt will deform to provide a substantially planar conveying surface under the load of conveyed articles.

The rearward end 16 of each of the modules 12 is similarly provided with a plurality of regularly spaced, substantially identical hinge barrels 24. These hinge barrels 24 are also of a length substantially equal to the width of the spaces between adjacent barrels. As illustrated, the hinge barrels 24 along the rearward edge 16 of each of the modules 12 are positioned substantially opposite the spaces between the hinge barrels 26 of the forward end 18. When so dimensioned and located, the hinge barrels 26 along the leading end 18 of a trailing module 12 fit within the spaces between the rearwardly extending hinge barrels 24 of the leading module 12 so as to form the substantially unbroken upper conveying surface 14.

As best seen in FIGS. 5 and 6, the undersurface of each of the modules 12 includes a plurality of drive pockets 28 adapted to engage the teeth of one or more driven sprockets (not shown). The drive pockets 28 are formed immediately rearwardly of the forwardly extending hinge barrels 26 and are defined, in part, by crossribs or tension webs 30 extending diagonally between the forwardly extending and the rearwardly extending hinge barrels 26 and 24, respectively. The forward end of each of the drive pockets 28 is defined by the rearward end of one of the forwardly extending hinge barrels 26, and the rear boundary of each drive pocket is defined by a back wall or web 32 formed across the spaces between the rearwardly extending hinge barrels 24. In the illustrated embodiment, each of the drive pockets 28 has a substantially trapezoidal shape tapering toward the leading end 18 of the module 12. Preferably, the forward and rearward edges of the drive pocket are radiused or rounded as best seen in FIG. 6 to facilitate engagement with the sprocket teeth and even provide distribution of wear on the drive pocket walls.

The individual modules 12 are joined for pivoting movement relative to one another by means of a pivot rod or pin 34 extending through the meshed, or axially aligned forwardly and rearwardly extending hinge barrels 26 and 24 of the adjacent modules 12. To this end, a cylindrical bore 36 is formed axially through each of the forwardly and rearwardly extending hinge barrels 26 and 24. The cylindrical bores 36 thus formed are positioned so as to be aligned when the barrels 26 and 24 are fully meshed. Each side of the module 12 includes an integrally formed side cap portion 38 having a forwardly extending projection 40 bridging the axis of the bores 36 formed through the forwardly extending barrels 26. Apertures 42 (FIG. 11) formed in the forwardly extending projections 40 of the end caps permit the pivot rods 34 to be inserted through the meshed hinge barrels 26 and 24 to link the modules 12 to one another.

To prevent unintended withdrawal of the pivot rods 34, the modular belt 10, in accordance with one aspect of the invention, includes a plurality of retainers 44 shaped and dimensioned to fit within retainer sockets 46 formed in the under surface of each side cap 38. As best seen in FIG. 11, each of the retainers 44 comprises an elongate insert or clip that is preferably formed of a resilient, preferably lubricious, plastic. Use of a lubricious material helps reduce friction and consequent wear. The clip includes a pair of side surfaces 47, 48 that further include inwardly directed, opposed cylindrical depressions 50. These depressions 50 matingly engage projections 52 of a complementary shape formed on the inner walls of the insert sockets 46 of the side caps 38. These depressions 50 help prevent lateral and vertical movement of the inserts 44 relative to the modules 12.

The forward end of each of the retainers 44 includes a pair of opposed, outwardly directed projections 54.

The projection 54 snap into the apertures 42 formed in the projections of the side cap 38 when the insert 44 is pressed into the socket 46. These projections 54 help retain the inserts 44 within the socket 46. In addition, the inwardly directed projection 54 provides a backstop that abuts the end of the pivot pin 34 and thereby prevents unintended withdrawal or displacement of the pivot pin 34. The inner directed projection 54 also ensures that the pivot pin is well seated and does not drift transversely which could cause disruptive vibrations of the side cap if the pivot pin 34 did not extend into the aperture 24 and affirmatively engage the insert 44.

A groove 56 formed at the forward end of the insert 44 forms a pry notch that can be used to remove the insert 44 from the socket 46 to permit disassembly of the belt 10. Preferably, the insert 44 is molded of a plastic having a different color than the module 12 so that the outer projection 54 is visible through the outer side aperture 42 of the side cap 38 to provide a visual indication that the insert 44 is in place. In addition, each insert 44 is preferably dimensioned to substantially fill the retainer socket 46 to form a substantially unbroken plane along the undersurface of each side cap 38 when the insert is in place. Again, the different color of the insert helps provide convenient verification that all inserts are in place.

In accordance with another aspect of the invention, each of the forwardly and rearwardly extending hinge barrels 26 and 24 is elongated in the direction of movement of the belt, thereby giving each hinge barrel an elongated cylindrical cross section as shown in FIG. 6. In addition the barrels 24 and 26 are each provided with a substantially flat, lower surface 58 as best seen in FIGS. 5 and 6. The flat lower surfaces 58 of the hinge barrels 26 and 24, along with the lower edges of the crossribs 30 and backwalls 32, form a plurality of bearing and wear surfaces that support and spread the wear of the conveyor belt 10 during operation and reduce relative contact pressure on the wear strips.

In accordance with still another aspect of the invention, the upper surface 14 of each module 12 is rounded somewhat adjacent its sides 20, 22. As best seen in FIGS. 7 through 10, this helps avoid a sharp transition or step between adjacent belts that can upset articles as they are transferred transversly from one belt to another. More particularly, in the prior art arrangement shown in FIGS. 7 and 8, unequal wear of the lower surfaces 60 of the modules of adjacent belts can form an abrupt step or ledge 62 that projects above the plane of the conveying surfaces of the belts. This is particular likely to occur when a new or unworn belt is placed adjacent a more worn belt. The resulting step 62 can "trip" or otherwise upset an article (for example an inverted beverage can 64) transferred from one belt to another across the step. As shown in FIGS. 9 and 10, the slightly rounded corners 18 and 16 of the modules 12 of the present invention cause any such step 66 resulting from uneven wear to be below the plane of the conveying surfaces 14. Accordingly, a conveyed article 64 transiting between adjacent belts does not engage the step 66 and is not "tripped" or otherwise upset.

The modular conveyor chain of the present invention provides many advantages. The use of a single linear module as a repeating basic components substantially simplifies the repeat unit for conveyor belt construction. The elongated hinge barrels having preformed bearing and wear surfaces or flats, reduce apparent wear and ensure that the belt wears in a controlled manner. The configuration of the drive pockets, the cross ribs and the backwebs provides an efficient and flexible means for acuating the conveyor belt and further contributes to the strength and rigidity of each module. The pivot rods and retainers provide a simple and convenient means for linking adjacent modules, and the different color of the retainers permits convenient visual confirmation that the conveyor belt has been completely and properly assembled. Each retainer is received fully within an individual module thereby avoiding projections that can cause jamming during operation. Finally, because each retainer can only be removed from the underside of the belt, the wear rails along which the belt slides in operation naturally function to block and thereby prevent unintended or inadvertent disengagement of a retainer.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A conveyor belt module defining a substantially unbroken upper conveying surface and comprising a unitary structure having a forward end, a rearward end, two opposed sides, a plurality of spaced hinge barrels formed along said forward end and a plurality of spaced hinge barrels formed along said rearward end, at least one of said hinge barrels formed along said forward and rearward ends being elongated in the direction perpendicular to said forward and rearward ends to create thereby a substantially rectangular, substantially planar wear surface on the underside of each said hinge barrel, said wear surface being vertically spaced from said upper conveying surface by a predetermined distance so that height discontinuities between adjacent ones of said conveyor belt modules are substantially avoided.

2. A conveyor belt module as defined in claim 1 wherein said upper conveying surface is substantially planar and wherein said conveying surface is tapered downwardly adjacent said sides of said module.

3. A conveyor belt module as defined in claim 1 wherein said module includes an undersurface and said undersurface further includes a plurality of tension webs extending substantially transversely across said undersurface between said hinge barrels formed on said forward end and said hinge barrels formed on said rearward end.

4. A conveyor belt module as defined in claim 3 wherein said module further includes a plurality of backwebs extending between said tension webs adjacent said rearward end and opposite said hinge barrels formed along said forward end.

5. A modular conveyor belt comprising:
a first conveyor belt module defining a substantially unbroken upper conveying surface and comprising a unitary structure having a forward end, a rearward end, two opposed sides, a side cap formed at each of said opposed sides, a plurality of spaced hinge barrels formed along said forward end and a plurality of spaced hinge barrels formed along said rearward end, at least one of said hinge barrels being elongated in the direction perpendicular to said forward and rearward ends to create thereby a substantially rectangular, substantially planar wear surface on the underside of each said hinge barrel, each hinge barrel further including a bore extending axially therethrough;

a second conveyor belt module substantially identical to said first conveyor belt module positioned and oriented so that the hinge barrels formed along said forward end of said second conveyor belt module are received within the spaced between the hinge barrels formed along the rearward end of said first conveyor belt module;

said wear surfaces of said first and second modules being vertically spaced from said upper conveying surfaces by a predetermined distance so that height discontinuities between the upper conveying surfaces of said first and second modules are substantially avoided;

a pivot pin extending through the bores of the interleaved hinge barrels of said first and second belt modules; and means for retaining said pivot pin within said bores of said interleaved hinge barrels.

6. A conveyor belt as defined in claim 5 wherein said side caps of said first and second conveyor belt modules include apertures through which said pivot pin can be inserted into and removed from the bores of said interleaved hinge barrels of said first and second conveyor belt modules.

7. A conveyor belt as defined in claim 6 wherein said retaining means includes an insert removably insertable into each of said side caps so as to occlude said apertures in said side caps and thereby block withdrawal of said pivot pin from said interleaved hinge barrels.

8. A conveyor belt as defined in claim 7 wherein each of said side caps includes a socket for receiving therein one of said inserts and wherein said insert is formed of a resilient material so as to provide a snap fit within said socket.

9. A conveyor belt as defined in claim 8 wherein each of said inserts and sockets includes means for resisting horizontal and vertical movement of said insert relative to said side cap.

10. A conveyor belt as defined in claim 9 wherein said end cap includes a substantially planar lower surface and wherein said insert is insertable into said socket through said lower surface.

11. A conveyor belt as defined in claim 10 wherein said insert substantially fills said socket so as to form a substantially unbroken surface along said lower surface of said side cap when said insert is received in said socket.

12. A conveyor belt as defined in claim 11 wherein said insert is of a different color than said first and second module so as to provide a visual indication of when said insert is in place in said conveyor belt.

13. A conveyor belt as defined in claim 2 wherein said insert is visible through said side of said first or second module so as to provide a further visual indication of when said insert is installed in said conveyor belt.

14. A modular conveyor belt comprising:

a plurality of modules in end-to-end relationship, each of said modules including:

a substantially planar, substantially unbroken upper surface;

a forward end having a plurality of regularly spaced forwardly projecting substantially identical hinge barrels, each of said hinge barrels having a longitudinal dimension slightly less than the distance between adjacent ones of said hinge barrels;

a rearward edge having a plurality of regularly spaced rearwardly projecting substantially identical hinge barrels, each of said hinge barrels being substantially identical to said hinge barrels of said forward edge and having a longitudinal dimension slightly less than the distance between adjacent ones of said hinge barrels on said rearward edge, said hinge barrels of said rearward edge being located substantially opposite said spaces of said forward edge so that said hinge barrels of the leading edge of one of said modules are received within the spaces formed between said hinge barrels of said rearward edge of another one of said modules when said modules are placed with said forward edge of one module adjacent said rearward edge of another the other module, at least one of said hinge barrels being elongated in the direction perpendicular to said forward and rearward edges so as to define thereby a substantially planar wear surface of substantially rectangular form, said wear surface having a longer dimension in a direction parallel to said forward and rearward edges and a shorter dimension in a direction perpendicular to said forward and rearward edges;

an undersurface including a plurality of drive pockets; and an insert pocket at each side of said module;

said modular conveyor belt further comprising:

a plurality of pivot rods inserted through the meshed hinge barrels of adjacent ones of said modules;

said wear surfaces of said first and second modules being vertically spaced from said upper conveying surfaces by a predetermined distance so that height discontinuities between the upper conveying surfaces of said first and second modules are substantially avoided; and a retaining insert within each of said insert pockets for retaining said pivot rods within the meshed hinge barrels of adjacent modules.

* * * * *